3,433,776
POLY(1,2-DIVINYL ETHYLENE OXIDE)-N₂F₄ ADDUCT

Anthony J. Passannante, Metuchen, and Eugene L. Stogryn, Fords, N.J., assignors to Esso Research and Engineering Company, a corporation of Delaware
No Drawing. Filed Aug. 22, 1962, Ser. No. 219,373
U.S. Cl. 260—88.3
Int. Cl. C08f 15/04
5 Claims This invention relates to a novel polyether of high $NF_2$ content prepared by reacting poly(1,2-divinyl ethyl oxide) with $N_2F_4$.

The novel poly(1,2-divinyl ethylene oxide)-$N_2F_4$ adduct has a novel structure and a distinctively high $NF_2$ content when made to have the structure represented by the recurring unit:

$$\left( \begin{array}{cc} -CH\!-\!\!\!-\!\!\!-\!\!\!-CH\!-\!O\!- \\ | \quad\quad | \\ CHNF_2 \quad CHNF_2 \\ | \quad\quad | \\ CH_2NF_2 \quad CH_2NF_2 \end{array} \right)$$

It is to be noted that this modified polymer of 1,2-divinyl ethylene oxide has in each monomer unit, 4 $NF_2$ oxidizing groups per 6 carbon atoms and, on complete saturation, can have up to 68.4 wt. percent of $NF_2$ content in the monomer units. This kind of polyether with terminal hydroxyl groups is useful in the formation of higher polymer binders in a solid rocket propellant composite by crosslinking, either to be made into acrylates or polyacrylates.

Methods for preparing the unsaturated epoxide monomer, 1,2-divinyl ethylene oxide, and the polymer are disclosed in U.S. application S.N. 219,368, filed Aug. 22, 1962, now U.S. Patent No. 3,261,819.

Briefly, to prepare 1,2-divinyl ethylene oxide, 3,4-dihydroxy 1,5-hexadiene is reacted with acetyl chloride in the presence of calcium chloride to produce the chloroester, 3-chloro 4-acetoxy 1,5-hexadiene, which is then reacted with alkali hydroxide. These reactions are shown by the following equations:

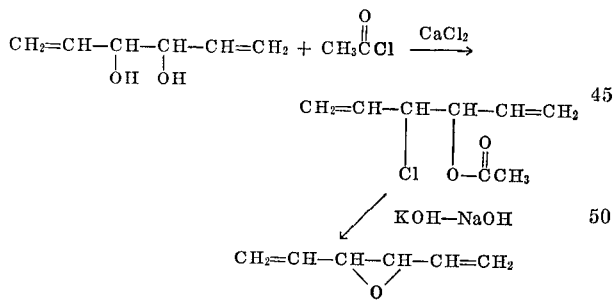

More details are given in the following description.

EXAMPLE 1

Preparation of 1,2-divinyl ethylene oxide

To rapidly stirred suspension of 3,4-dihydroxy 1,5-hexadiene, $H_2C{:}CH{\cdot}CHOH{\cdot}CHOH{\cdot}CH{:}CH_2$, 288 grams, and 41.6 grams of calcium chloride was added 190 grams of acetyl chloride over a period of 45 minutes. During the course of addition, the reaction mixture was maintained at a temperature between 0° and 10° C. The stirred mixture was slowly brought to room temperature and stirring was continued, for 24 to 48 hours. At the end, the reaction mixture was warmed to 50° C. for 1 hour. The reaction mixture was then poured into ice and extracted with ether. The ether layer was neutralized with a saturated solution of sodium bicarbonate. The ether layer was dried over anhydrous potassium carbonate, filtered, and the ether removed by distillation. In this fashion, there was obtained 269 grams of the crude chloroester, 3-chloro 4-acetoxy 1,5-hexadiene $$CH_2{:}CH{\cdot}CHCl{\cdot}CH(OOCCH_3){\cdot}CH{:}CH_2$$

The chloroester was converted to divinyl ethylene oxide by adding 257 grams of the crude chloroester product, described above, dropwise to a stirred mixture of 362 grams of sodium hydroxide, 362 grams of potassium hydroxide, and 362 grams of water heated to 170° C. by a sand bath. The divinyl ethylene product was flashed over into a collection vessel by maintaining a slight vacuum on the system. Approximately 80 ml. of crude epoxide was collected in this fashion. Distillation of the crude product yielded 40 g. of divinyl ethylene oxide, boiling point 108° to 110° C., a 21% yield based on 3,4-dihydroxy 1,5-hexadiene.

To obtain the polymers of 1,2-divinyl ethylene oxide monomer, this monomer is polymerized at a reaction temperature in the range of about 0° to 150° C., preferably in the presence of an epoxide polymerization catalyst in the amount of about 0.1 to 10% by weight of the epoxide monomer.

Polymerization of 1,2-divinyl ethylene oxide

Table I, given below, serves to illustrate the catalysts that one can utilize for the polymerization of 1,2-divinyl ethylene oxide to yield either low molecular weight polymer or high molecular weight polymers. This table only serves to illustrate the catalyst that can be utilized for this epoxide polymerization and is not intended to be restrictive.

TABLE I

| Monomer | Catalyst | Time (days) | Temperature | Properties |
|---|---|---|---|---|
| Divinyl ethylene oxide. | $PF_5.THF$ [1] | 3 | Ambient | Pale yellow solid. |
| Do | $Al(i\text{-}Bu)_3.H_2O$ [2] | 2 | do | Yellow solid plus viscous liquid. |
| Do | $NaOCH_3$ | 3 | 100° C | Viscous liquid. |
| Do | $PF_5$ | 3 | Ambient | Do. |
| Divinyl ethylene oxide plus $H_2O$ (9:1 molar ratio). | $PF_5$ | 3 | do | Do. |

[1] THF is tetrahydrofuran.
[2] Triisobutyl aluminum treated with one mole of $H_2O$.

The polymer obtained in these experiments are unsaturated polyethers, viz. they contain a polyethylene oxide chain with a substituent vinyl group on each carbon in the polymer chain, as represented in the following formula of the recurring unit:

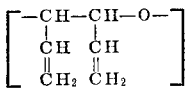

This structure is confirmed by the infrared spectra of the polymers. These polymers contain appreciable hydroxyl functionality which can be utilized in the preparation of polyurethanes and acrylate derivatives useful as synthetic rubbers, textile sizes, etc.

The recurring unit will be present in the polymer a number of times, e.g., 2 upwards to about 100 or more, depending on the molecular weight, which in turn depends on the purity of the divinyl ethylene oxide monomer, the catalyst, and polymerization conditions. The molecular weight of the polymers may vary in the range of about 200 to about 10,000 and higher. The preferred polymers used for the reaction with $N_2F_4$ have an average of 3 to 30 units and molecular weights in the range of about 300 to 4000.

The following examples illustrate conditions of the polymerization reaction which has been summarized in the preceding Table I.

EXAMPLE 2

To 10 parts by weight of the divinyl ethylene oxide, prepared as described in Example 1, is added 1 part of phosphorus pentafluoride-tetrahydrofuran complex. The monomer and catalyst mixture is stirred and maintained at ambient or room temperature (20° to 30° C.) for 3 days to form a pale yellow solid polymer having the recurring unit described.

EXAMPLE 3

The divinyl ethylene oxide monomer is polymerized with 10% of the triisobutyl aluminum-water catalyst (prepared by treating one mole of Al(i-Bu)$_3$ in n-heptane with one mole of H$_2$O). The polymerization was carried out over a period of 2 days at ambient temperature to form a polymer product which is a yellow solid and viscous liquid.

EXAMPLE 4

The divinyl ethylene oxide monomer mixed with 5% of sodium methylate reacts in 3 days at a polymerization temperature of 100° C. to form a viscous liquid having the desired composition.

EXAMPLE 5

In a mixture of the divinyl ethylene oxide monomer with water in a 9:1 molar ratio, 0.5% of the PF$_5$ catalyst is used for the polymerization over a period ranging up to 3 days at room temperature to form the desired viscous liquid polymer.

The OH functionality of these polyethers can be increased by polymerization of the divinyl ethylene oxide in the presence of an OH-containing modifier, such as water, ethylene glycol, trimethylol propane, glycerol, and pentaerythritol. For example, the water-modified polyether described in the above examples has appreciably higher OH content than the corresponding polyether which was prepared in the absence of water. In general, the polyethers may contain 1 to 4 OH groups per molecule, but usually the polyethers contain on an average about 2 OH groups per molecule.

Preferably, 0.5 to 2 wt. percent of catalyst, based on the monomer, is used. The polymerization temperature may be varied from about 0° to 150° C. It may not be necessary to employ solvents or diluents in the polymerization, but inert solvents or diluents, or those which act as modifiers, may be used in the polymerization.

The preferred method of this reaction involves the use of a chloro alkane solvent, such as a $C_1$ to $C_3$ alkane having 2 to 3 Cl substituent atoms per molecule, as in 1,2-dichloro ethane, di and trichloro propanes, CHCl$_3$, and CH$_2$Cl$_2$.

Poly(divinyl ethylene oxide)-N$_2$F$_4$ adducts

Poly(divinyl ethylene oxide)-N$_2$F$_4$ adducts have been prepared successfully by addition reaction with N$_2$F$_4$ in a halohydrocarbon solvent solution with moderate temperatures in the range of about 60° to 150° C. The adducts-products have been obtained with an NF$_2$ content in the range of 60 to 68 wt. percent, and in various states ranging from viscous liquids to solids.

The solvent used in the reaction preferably dissolves the reactants and the modified polymer product. Sufficient N$_2$F$_4$ is used to react with the double bonds of the polymer, e.g., about 2 to 10 N$_2$F$_4$/monomer units.

EXAMPLE 6

Poly(divinyl ethylene oxide) dissolved in methylene chloride was reacted with N$_2$F$_4$ in a proportion of 6 moles of N$_2$F$_4$ per monomeric unit for about 8 hrs. at 100° C. in a glass pressure vessel. The resulting liquid reaction product mixture was degassed and filtered to remove a small amount of insoluble material which had formed. The solvent was evaporated from the resulting product solution to yield a yellow stringy solid that was easily soluble in methylene chloride. Analyses were obtained of the polymer indicating that the reaction tended toward complete saturation of the double bonds in the two pendant vinyl groups present in each of the recurring units.

TABLE II.—POLY(DIVINYL ETHYLENE OXIDE)-N$_2$F$_4$ ADDUCT

*Analyses.*—Calc. for [C$_6$H$_8$(NF$_2$)$_4$]: C, 23.6%; N, 18.4%; F, 50.0%. Found: C, 31.08%; N, 16.17%; F, 46.0%.

Infrared spectrum analyses of the polymer-N$_2$F$_4$ adducts showed that these adducts had the composition and structure of poly[1,2,5,6-tetrakis-(difluoramino)-hexene-3 oxide] represented as:

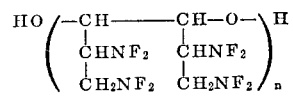

The recurring units are joined together a number of times, signified by the subscrip $n$ which is in the range of about 3 upwards to about 30 or more, depending on the polymer or fraction of polymer used as the poly(divinyl ethylene oxide) reactant.

Evaluations have indicated that the poly(divinyl ethylene oxide)-N$_2$F$_4$ adduct is one of the best potential binders prepared up until now. A typical formulation for which a specific impulse of about 290 has been determined would contain 20 wt. percent of the polyether having the recurring unit [C$_6$H$_8$O(NF$_2$)$_4$] as binder with 50 wt. percent of the liquid oxidizer and plasticizer tetrakis (NF$_2$) butane, 26.5 wt. percent hydrazinium nitroformate, and 3.5 wt. percent boron powder as fuel. The liquid fluorine oxidizer component may be varied in composition and proportion. For instance, it may be partly or fully replaced by other liquid organic NF$_2$-containing compounds. The liquid NF$_2$-containing oxidizer can be decreased in proportion as the solid nitroformate is increased. Other types of oxidizers and other types of powdered metal fuels may be used.

What is claimed is:

1. Poly(1,2-divinyl ethylene oxide)-N$_2$F$_4$ adduct containing about 60 to 68 wt. percent NF$_2$.

2. Poly [1,2,5,6,-tetrakis-(NF$_2$)-hexene-3- oxide] having the structural formula:

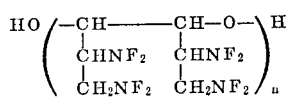

the subscript *n* signifying about 3 to 30 of the recurring units.

3. Method of preparing poly(1,2-divinyl ethylene oxide)-$N_2F_4$ adduct, which comprises reacting poly(1,2-divinyl ethylene oxide) with $N_2F_4$ at about 60° to 150° C. and recovering the resulting $N_2F_4$ adduct.

4. Method of claim 3 in which the poly(1,2-divinyl ethylene oxide reactant and $N_2F_4$ adduct product are dissolved in the same inert liquid organic solvent.

5. Method of claim 4 in which said solvent is a chloro alkane of 1 to 3 carbon atoms with 2 to 3 chlorine atom substituents per molecule.

References Cited

Hoffman et al., Chem. Reviews, vol. 62, pp. 12 to 18 (1962).

LELAND A. SEBASTIAN, *Primary Examiner.*

U.S. Cl. X.R.

149—19, 22, 89, 109; 260—91.1, 584, 96